July 29, 1969    E. J. KLEINER ET AL    3,457,955

AERODYNAMICALLY BALANCED VALVE

Filed Jan. 3, 1967

ERICH J. KLEINER
GARLAND P. PEED
INVENTORS.

BY *[signature]*

ATTORNEY

United States Patent Office 3,457,955
Patented July 29, 1969

3,457,955
AERODYNAMICALLY BALANCED VALVE
Erich J. Kleiner, Palos Verdes, and Garland P. Peed, Malibu, Calif., assignors to The Garrett Corporation, Los Angeles, Calif., a corporation of California
Filed Jan. 3, 1967, Ser. No. 613,064
Int. Cl. F16k 25/02
U.S. Cl. 137—625.44                              11 Claims

ABSTRACT OF THE DISCLOSURE

A single stage valve for controlling gas flow in which the valve closure element is operably connected to a movable member balanced aerodynamically to reduce the actuating force necessary for valve operation.

BACKGROUND OF THE INVENTION

The invention relates in general to valves for controlling the flow of gases and more particularly to a single stage valve which is aerodynamically balanced by high momentum gas streams permitting valve actuation by relatively small actuating forces.

Increasingly demanding requirements for the application and control of gas flow demand valve means which are capable of quick, accurate response with but moderate actuating force and which are not limited to handling a particular or narrow range of mass flows. Existing valves generally do not provide for such response in a single stage and further are not adapted to handling gas flows of wide variation in mass and temperature. Where the objective is control of relative gas flow through two conduits, as is the case in the preferred embodiment of this invention, existing valves may provide for such response; but they are likewise generally not adapted to the handling of flows which vary widely in mass and temperature. Such valves frequently rely upon rigidly mounted flexible flapper elements which are actuated by solenoid means responsive to actuating signals. Inasmuch as the structure and material of the flapper and associated elements are fixed, an optimum operating condition governs valve design, and operation departing therefrom becomes progressively less effective.

SUMMARY OF THE INVENTION

The valve of this invention is directed to providing for quick and accurate control response with a minimum of actuating force and is adapted to handling gas flow of wide variation in mass and temperature. The valve in its preferred illustrated embodiment—to which the invention is not necessarily limited—comprises a closed housing with which communicate a pair of substantially aligned conduits. Positioned for pivotal movement within the housing intermediate the conduits is a valve member which carries a self-aligning valve closure element for effecting selective end closure of the conduits. A fixed torsion bar serves as the pivotal mount for the valve member and solenoid actuation is employed to pivot the member by means of interaction with an armature positioned at one extremity of the member. The housing is provided with gas intake nozzles or ports which direct gas into the housing, converting the gas pressure into a substantially constant velocity for impingement against aerodynamic elements positoned at the other extremity of the member. The developed gas momentum is thereby utilized to balance other forces acting upon the valve and serves thereby to minimize the required valve actuating force.

In addition to providing the above response and mass handling capabilities, the invention has the following as objectives:

(1) Simple one stage design with substantially frictionless operation and no sliding parts or seals, a particularly important consideration where operating with hot or contaminated gases.

(2) Elimination of stressed mechanical parts, such as return springs, in the hot gas path and elimination of small orifices, narrow clearances and flow passages sensitive to hot or contaminated gas flow.

(3) Operation essentially independent of operating pressure.

(4) Adaptable to control by pulse modulation techniques.

(5) Ease of and low production cost.

Other objects and advantages of this invention will become apparent from the following description when taken in conjunction with the drawing in which:

DESCRIPTION OF THE PREFERRED EMBODIMENT

Figure 1:
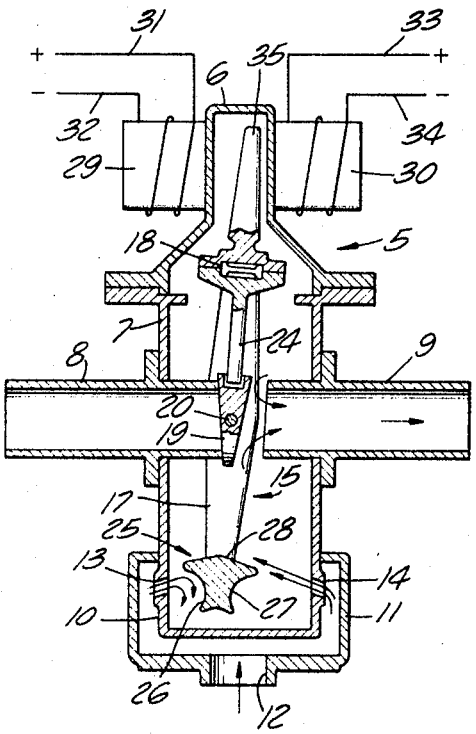
FIG. 1 is a sectional view of a preferred embodiment of the invention with the valve in one of its close positions and the arrows indicating the direction of gas flow.

In FIG. 1 the valve is shown comprised of a closed housing 5 with a flanged upper portion 6 secured, as by welding, to a flanged intermediate portion 7 with which latter communicate flanged left and right conduits 8 and 9. Embracing the housing lower portion 10 is an annular manifold 11 to which gas is admitted through port 12 for entry into housing lower portion 10 through rectangular return ports or nozzles 13 and 14, which in size and location provide for conversion of gas pressure to gas momentum for purposes presently to be described.

Figure 2:
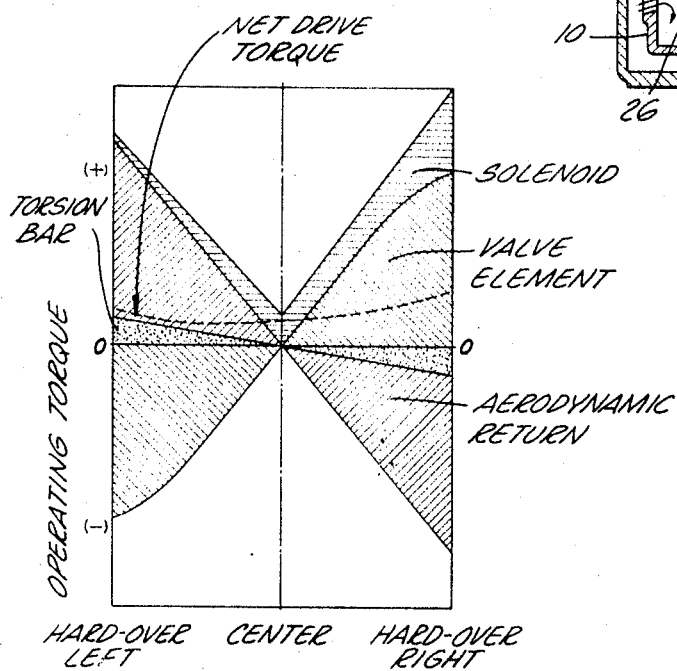
FIG. 2 is a graphical summation of the drive torques acting upon the valve as it is driven from the FIG. 1 position of closure of the left conduit into a position of closure of the right conduit.
Figure 3:
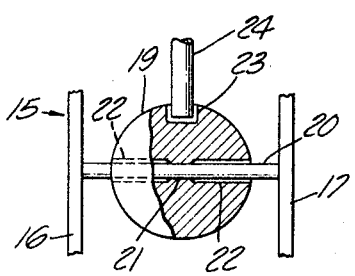
FIG. 3 is an enlarged view, partially in section, illustrating the structure which provides limited freedom of movement to the valve element for achieving seating abuttment with the conduit undergoing closure.

A member 15 having a pair of spaced apart elongated arms 16 and 17 (FIG. 3) is carried upon a torsion bar 18 for pivotal movement within housing 5 to and from the FIG. 1 position of closure of conduit 8 and the hardover right position of closure of conduit 9 referenced in FIG. 2. Carried by member 15 is a generally circular valve closure element 19 the tapered cross section of which is defined by planar faces. Closure element 19 is permitted limited movement upon elongated shaft 20 which is secured at either end to arms 16 and 17. As shown in FIG. 3, shaft 20 extends through a central bore 21 in the closure element and counterbores 22 at either end thereof. Received at the upper extremity of the closure element within a recess 23 is a cantilevered or depending member 24 secured at its upper end to member 15. An examination of FIG. 3 indicates that the valve closure element through the above described construction is permitted movement about shaft 20, being limited therein by abuttment of the walls of counterbore 22 with the shaft 20 and by abuttment of the walls defining recess 23 with cantilevered member 24. Since the closure element 19 is provided with planar faces which abuttingly engage the respective open ends of the conduits 8 and 9 to achieve flow blockage, alignment of the closure element with the conduit end surfaces is extremely important. It is for this reason that the closure element 19 is allowed limited freedom of movement.

Carried at the lower extremity of member 15 is an aerodynamic return valve element 25 which is secured to and positioned intermediate arms 16 and 17. The return valve element 25 is provided with opposed concavities 26 and 27 of generally arcuate shape for impingement by gas admitted through return nozzles 13 and 14. The upper portion of the return valve element is provided with a pair of generally flat surfaces 28 which gently slope downward from a centrally disposed crown or apex to provide valve element bypass of gas admitted through the nozzle remote from the valve element, e.g., nozzle 14 in FIG. 1.

A pair of solenoids 29 and 30 are positioned to either side of housing upper flanged portion 6. Energization of the solenoids 29 and 30 is accomplished through positive and negative leads 31 and 32 and 33 and 34 respectively. It has been found that laminated core construction is to be preferred both for the solenoids and for the armature 35, which latter is carried at the upper extremity of member 5 for valve actuation through interaction with the solenoids. Although not shown, means may be provided for pulse modulation control of the valve which is very effective because of the balancing of torques imparted to valve member 15 and the resultant low torques required for valve actuation.

As illustrated in FIG. 1, the valve serves to divide the inlet gas flow between conduits 8 and 9. The control solenoids 29 and 30 modulate gas flow between these conduits through interaction with armature 35, urging member 5 in pivotal movement about its torsion bar support 18 until the valve closure element 19 is positioned, as in FIG. 1, to close the open end of conduit 8 and open conduit 9 or conversely, to open conduit 8 and close conduit 9.

As indicated by the arrows in FIG. 1, the path of gas flow is through port 12 into the manifold 11 and then into housing 5 through rectangular return ports or nozzles 13 and 14. These nozzles are preferably designed to provide constant high velocity flow, thereby substantially to isolate valve operation from variations in pressure where the pressure at the nozzles is at least sufficient to maintain such constant high velocity flow. When the closure element 19 moves into a position of conduit closure seating against the end of conduit 8 or 9, a torque results upon the member 5 as gas flows into the open conduit, creating a pressure differential at the valve closure element. It is therefore necessary to provide a counteracting torque of somewhat lesser amount which acts in an opposite direction to reduce the starting force requirements for the opposite solenoid. Although this might be accomplished by the spring gradient of the torsion bar 18, such approach is undesirable where the valve is to be used for hot gas control, because of the effect of increased temperature on the torsional modulus of the bar. It is for this reason that a pair of return nozzles 13 and 14 have been provided to develop opposing high momentum gas streams. The nozzles develop aerodynamic restoring torque upon the arm assembly when it is in either extreme position as is shown in FIG. 2. The solenoid torque acting upon the armature 35 and the valve element torque due to the differential pressure at the valve closure element 19 serve to hold the arm assembly in the hard-over position of conduit closure. The torsion bar spring 18 and the aerodynamic return 25 provide a restoring torque. A summation of these torques is shown graphically in FIG. 2.

As previously indicated, the nozzles 13 and 14 are sized to convert the gas pressure to a high velocity flow, thereby to develop a high momentum gas stream. In FIG. 1 it will be seen that nozzle 13 is angled to direct the entering gas into impingement with the concavity 26 of return valve 25. The stream flow is directed to one side of the concavity to permit stream turn-back, which is important in effecting energy transfer to the member 5. Note that the gas entering through port 14 is also directed upwardly, but is directed to bypass the concavity 27, flowing over the slanted upper right hand surface of valve 25, and therefore has but little effect in imparting any torque to member 15. Of course with reversal of the valve position and blockage of conduit 9 in the hard-over right position concavity 27 serves to impart a substantial restorative torque to the assembly through action of gases directed thereinto by nozzle 14. At such time there is but little effect upon member 15 from the action of gas admitted by nozzle 13. As is evident from FIG. 2, the return valve element 25 imparts a torque which varies linearly from a positive or counterclockwise direction through a neutral position (with valve member 15 centered) to a negative or clockwise direction.

Where hot gas is employed it is important that the two rectangular nozzles 13 and 14 which serve to accelerate the gas to high velocity and direct it in two streams toward the aerodynamic return vanes be so dimensioned that the growth of the member 5 during warm gas operation does not influence the torque balance of the arm.

In FIG. 2 the broken line curve indicates the net drive torque imparted to member 5 as the solenoid 30 is energized to drive member 15 from the hard-over left position of FIG. 1 to a hard-over right position blocking conduit 9. The respective torques are shown in FIG. 2 by way of summation. Thus the solenoid-produced torque increases as the armature 35 moves toward solenoid 30 reaching a maximum or holding torque at the hard-over right position. As shown, the torque imparted through action of solenoid 30 is implemented by the similarly acting positive torques of the torsion bar 18 and the aerodynamic return valve element 25. Acting in opposition is the negative torque resulting from the pressure differential at the valve closure element 19. Of course the torque relationships are the reverse or mirror image of those shown in FIG. 2 when the valve is moved from the hard-over right to the hard-over left position.

Although the valve of this invention has been described in the preferred embodiment herein for use in conjunction with a pair of conduits, thereby providing an excellent means for control of relative flow, the invention is also adapted to the control of flow through other conduit arrangements. Thus control of flow through a single conduit or through more than the two conduits illustrated can be accomplished.

What is claimed is:
1. In a valve for the control of gas flow, the combination comprising:
 a housing having walls defining a closed cavity,
 port means in said housing for conveying gas therefrom,
 means defining at least two ports for directing gas into the housing,
 a valve member disposed within said housing cavity for pivotal movement,
 a valve element carried by said member for movement into and out of position of closure of said port means,
 means for driving said member in pivotal movement to effect said positioning of the valve element,
 and return valve means provided with at least two gas-receiving cavities and operatively connected to said member, said return valve means being positioned for movement intermediate said at least two ports responsive to impingement against the cavities of the return valve means of gas admitted by said ports.
2. The combination of claim 1, wherein the cavities of the return valve means are of concave shape.
3. The combination of claim 2, wherein said cavities of the return valve means are of substantially arcuate shape and positioned to direct the impinging gas in streamline flow.
4. The combination of claim 1, wherein the valve element is provided with means permitting it limited self-aligning movement in effecting closure of said port means.
5. In a valve for the control of gas flow, the combination comprising:

a housing having walls defining a closed cavity,
at least two ports in said housing for conveying gas therefrom,
means defining at least two ports for developing momentum from gas directed by the ports into said housing,
a valve member disposed within said housing cavity for pivotal movement,
a valve element carried by said member for movement into and out of position of respective closure of said ports,
means for driving said member in pivotal movement to effect said port closure, and
return valve means provided with at least two gas-receiving cavities, said return valve means being carried by said valve member for urging the latter in movement responsive to gas directed against respective cavities of the return valve means by said momentum-developing ports.

6. In a valve for the control of gas flow, the combination comprising;
a housing having walls defining a closed cavity,
at least two ports in said housing for conveying gas therefrom,
means defining at least two ports for respectively directing streams of gas into said housing cavity,
a valve member disposed within said housing cavity for pivotal movement,
a valve element carried by said member for movement into an out of position of closure of either of said ports,
means for driving said member in pivotal movement, to effect said port closure, and
return valve means carried by said valve member having at least two gas-receiving cavities for respective impingement by said gas streams, whereby substantially equal forces are imparted to said return valve means when it is positioned equidistant from said nozzles and a force differential created which increases in magnitude as the said valve means moves from said neutral position to approach one or the other of the nozzles.

7. The combination of claim 6, wherein said cavities of the return valve means are of concave shape.

8. The combination of claim 7, wherein said cavities of the return valve means are of generally arcuate shape and positioned to direct the impinging gas in stream-line flow.

9. In a valve for the control of gas flow, the combination comprising:
a housing having walls defining a closed cavity,
port means defining at least two substantially axially aligned spaced apart ports in said housing for conveying gas therefrom,
means defining at least two ports for directing streams of gas into the housing,
a valve member disposed within said housing cavity for pivotal movement,
a valve element carried by said member for movement into and out of position of closure of either of said aligned ports,
means for driving said member in pivotal movement to effect said port closure, and
return valve means carried by said valve member having at least two gas-receiving cavities for respective impingement by said gas streams, whereby substantially equal forces are imparted to said return valve means when positioned midway between said nozzles and a force differential created with increases in magnitude as to said valve means moves from said neutral position to approach one or the other of the nozzles.

10. The combination of claim 9, wherein said valve element is provided with means permitting its limited movement relative to said ports to permit self-alignment of the valve element in effecting closure of said ports.

11. The combination of claim 10, wherein said valve member is provided with a pair of spaced-apart arms between which the valve element is carried for movement upon a member supported at either end by said arms and wherein said self-aligning movement is limited by a limit member secured to the valve member.

References Cited

UNITED STATES PATENTS

| | | | |
|---|---|---|---|
| 2,999,640 | 9/1961 | Waterfill | 137—625.44 X |
| 3,282,283 | 11/1966 | Takeda | 137—85 X |

FOREIGN PATENTS 509,471  7/1939  Great Britain.

HENRY T. KLINKSIEK, Primary Examiner

MICHAEL O. STURM, Assistant Examiner

U.S. Cl. X.R.

137—484.2